United States Patent [19]
Ike

[11] 3,826,176
[45] July 30, 1974

[54] VEHICLE BRAKE
[75] Inventor: Ernest C. Ike, Santa Rosa, Calif.
[73] Assignee: Wiz Corporation, Concord, Calif.
[22] Filed: June 28, 1972
[21] Appl. No.: 267,311

Related U.S. Application Data
[63] Continuation of Ser. No. 73,711, Sept. 21, 1970, abandoned.

[52] U.S. Cl............................ 92/25, 92/63, 92/64, 188/265
[51] Int. Cl........................................... F15b 15/26
[58] Field of Search ............... 92/15, 23, 24, 25, 63, 92/64; 188/265

[56] References Cited
UNITED STATES PATENTS
2,752,008  6/1956  Peterson et al. .................... 92/15 X
3,260,168  7/1966  Cruse ................................. 92/63 X
3,431,031  3/1969  Ike ..................................... 92/64 X
3,450,008  6/1969  Fites .................................... 92/24
3,509,795  5/1970  Woodward........................... 92/64
3,597,016  8/1971  Gachat et al. ................... 188/265 X Primary Examiner—Edgar W. Geoghegan
Assistant Examiner—Abraham Hershkovitz
Attorney, Agent, or Firm—Limbach, Limbach & Sutton

[57] ABSTRACT

A captive air brake for vehicles adapted to be used as a parking brake for trucks having a mechanical lock for holding the brake in a brake applied position after the energy for application of the brake has been supplied by a captive body of fluid under pressure.

5 Claims, 7 Drawing Figures

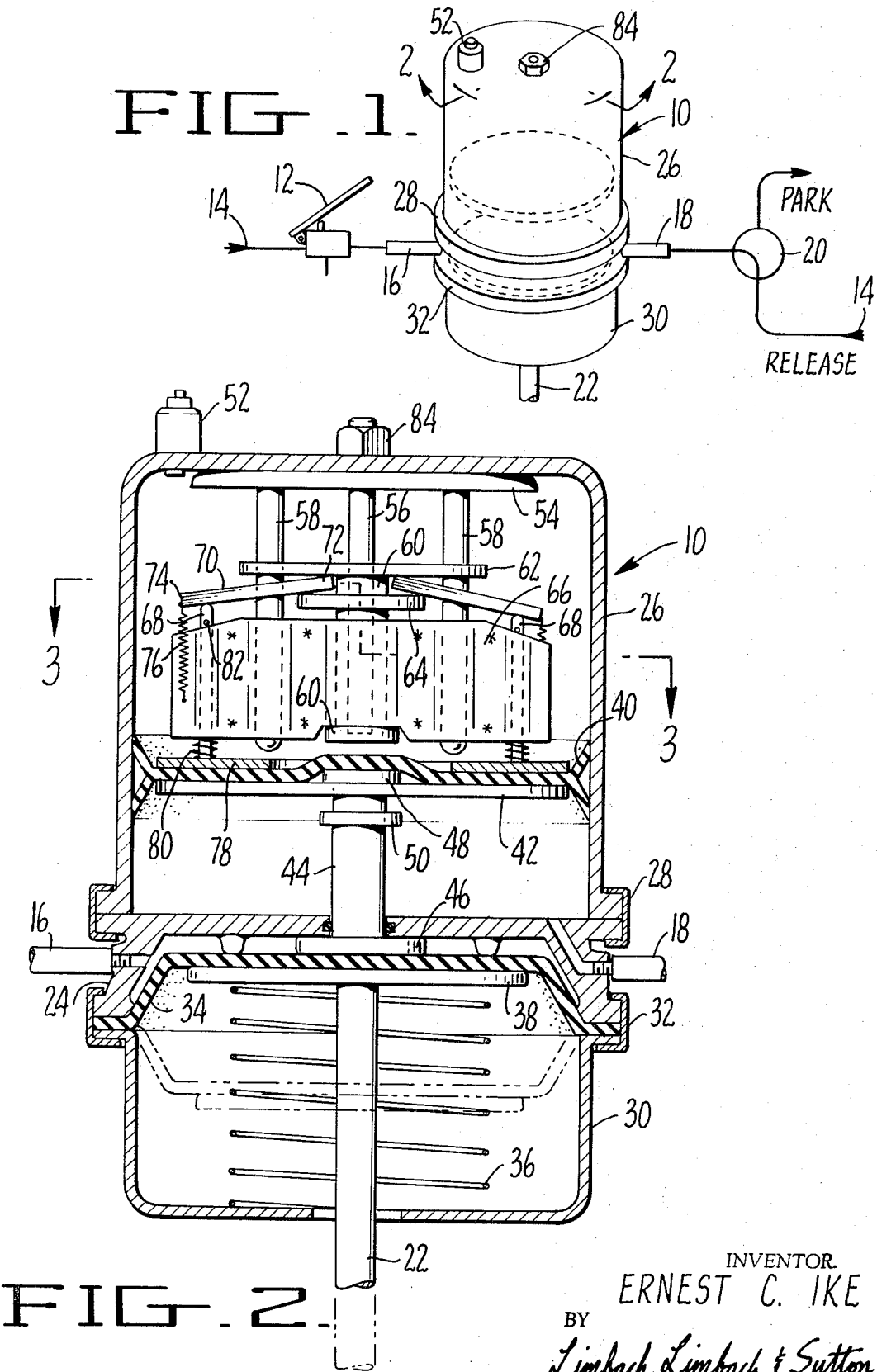

INVENTOR.
ERNEST C. IKE
BY Limbach, Limbach & Sutton
ATTORNEYS

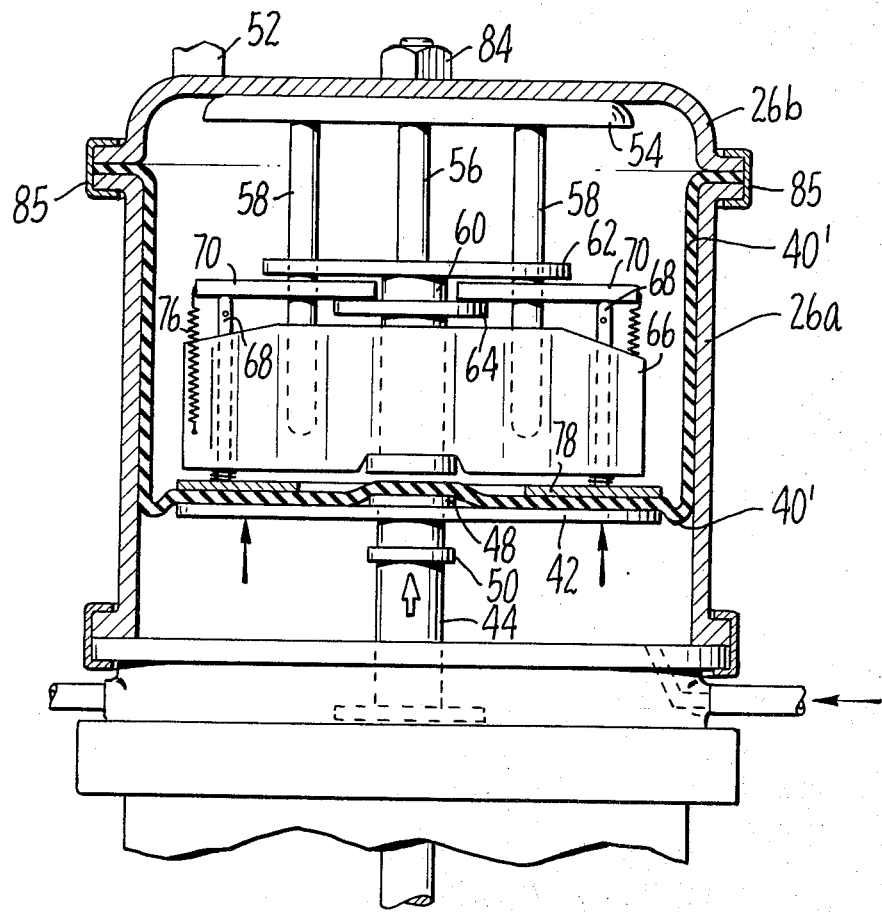

VEHICLE BRAKE

This is a continuation of application Ser. No. 73,711, filed Sept. 21, 1970, now abandoned.

RELATED PATENTS

My U.S. Pat. No. 3,431,031 and Woodward U.S. Pat. No. 3,479,927, both owned by the assignee of this application, disclose "captive air" brakes where the primary energy for application of a parking brake is stored in a captive body of fluid under pressure instead of in a spring. The basic advantages of "captive air" brakes of this type are discussed in these patents.

The advantages of "captive air" brakes are very substantial, but these brakes involve a serious disadvantage. A slow leak in the body of captive fluid while the brakes are applied can cause brake failure. Thus, air replenishment systems may be employed for adding air to the captive body of fluid from a service brake air reservoir of the vehicle to compensate for any small leaks of air from the captive body while the vehicle is operating and has air pressure in its service brake system. When the vehicle is idle, however, small leaks may, in time, exhaust the captive air body to release brakes which are held in the applied position solely by the captive air body.

SUMMARY OF INVENTION

In accordance with this invention, I employ the energy of the captive air body to apply a vehicle brake, but once the brake is applied I hold the brake in the applied position with a mechanical lock. This system eliminates the above-mentioned disadvantages of the prior "captive air" systems, and at the same time this system still avoids the problem in prior mechanical systems that high energy springs were required for application of the brakes.

In the "captive air-brake locking" system of this invention, the large amount of energy for application of the brakes may come in its entirety from the captive air system, and very little energy need be used to lock the brakes once they are applied.

A wide variety of mechanical locks may be employed in accordance with this invention with the mechanical lock supported in the body of captive air or outside the body of captive air and in an air pressure chamber which is generally employed with systems of this type receiving air pressure to unlock the parking brakes. Many different mechanisms may be employed for the actual locking structure, but I prefer to employ an expansion mechanism mounted in the captive fluid body and employing two structural members interconnected by a "jamb nut," that is an apertured link which locks against one of the structural members by gripping the structural member in the aperture of the link.

Other features and advantages of the invention will become apparent from the following description read in conjunction with the attached drawing in which:

FIG. 1 is a schematic view of a truck braking system employing the brake of this invention;

FIG. 2 is a sectional view of the braking mechanism of FIG. 1 taken along the plane indicated at 2—2 in FIG. 1, it being noted that the plane 2—2 is bifurcated and includes two plane segments which are inclined to each other at an angle of about 90° along the axis of the apparatus of FIG. 1;

FIG. 4 is a view similar to FIG. 2 but illustrating the apparatus in a condition where the parking brake is applied whereas FIG. 2 illustrates the apparatus in a condition where the brakes are released;

FIG. 5 is a view similar to FIGS. 2 and 4 illustrating the apparatus in an intermediate condition of the apparatus as the parking brake is released. In addition to showing the parts of the brake system in the process of releasing the brakes, FIG. 5 shows a somewhat modified construction of the apparatus;

FIG. 6 is an enlarged sectional view of a portion of the apparatus shown in the condition of the apparatus in FIG. 4, and FIG. 7 is a view similar to FIG. 6 showing the apparatus in the condition of FIG. 5.

DETAILED DESCRIPTION

Figure 3:
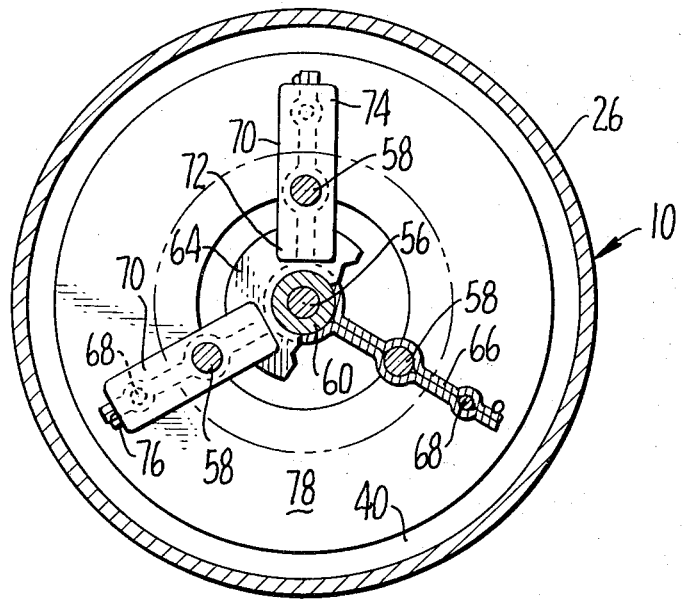
FIG. 3 is a sectional view taken along the plane indicated at 3—3 in FIG. 2.

Referring now in detail to the drawings and particularly to FIG. 1, the apparatus illustrated therein includes a housing 10 connected through a service brake valve 12 to a source of air pressure 14 by way of a port 16 and connected from a port 18 through a two-way valve 20 to the source of pressure 14. The valve 20 may be moved from the parking brake release position illustrated in FIG. 1 to a park position in which the port 18 in the housing 10 is connected to vent. A reciprocable rod 22 extends from the housing 10 and is connected to conventional brake structure so that when the rod is pushed out of the housing 10 the brakes of a vehicle are engaged.

Referring now in detail to FIG. 2, the housing 10 includes a central casting 24, an upper metal dome 26 attached to the casting by a ring 28, and a lower metal dome 30 attached to the casting 24 by a ring 32 with a flexible diaphragm 34 held between the dome 30 and casting 24 and a spring 36 held between the dome 30 and a flange 38 on rod 22.

Port 16 is connected to the head space between casting 24 and diaphragm 34 so that air pressure delivered through port 16 forces the flange 38 and rod 22 downwardly to a brake applied position.

The dome member 26 contains a flexible membrane 40 which is illustrated herein in the form of a flexible rubber web on the top of a metal piston flange 42, but the membrane 40 may take the form of a full enclosure for the captive air body similar to that shown in FIG. 1 of my above-identified patent.

A brake operating member 44 is mounted in the dome 10 and extends through an aperture in casting 24 (provided with an 0-ring as illustrated), and the brake operating member 44 is provided with a lower flange 46 adapted to press downwardly on the brake operating rod 22 to move the vehicle brake to a brake engaged position. The upper end of the brake operating member 44 is provided with a pair of spaced flanges 48 and 50 above and below the piston 42 respectively, with the two flanges 48 and 50 spaced apart by a short distance to provide a lost motion connection as described hereinafter.

A captive air charging valve 52 is provided in the top of dome member 26 for charging compressed air above the flexible membrane 40 so that the device will operate substantially as described in my above mentioned patent.

In this regard, air is introduced under pressure through port 18 into a pressure chamber to force piston 42 and membrane 40 upwardly compressing the captive air to hold the vehicle brakes in a brake released position. When the parking brakes are to be applied, the port 18 is connected to vent through valve 20, and captive air above the membrane 40 forces the piston 42 and brake operating member 44 downwardly to move the brake rod 22 downwardly to a brake engaged position. It will be noted that the energy provided for moving the brakes to a brake engaged position is the energy stored in the compressed air in the captive air chamber above the rubber diaphragm 40.

Figure 4:
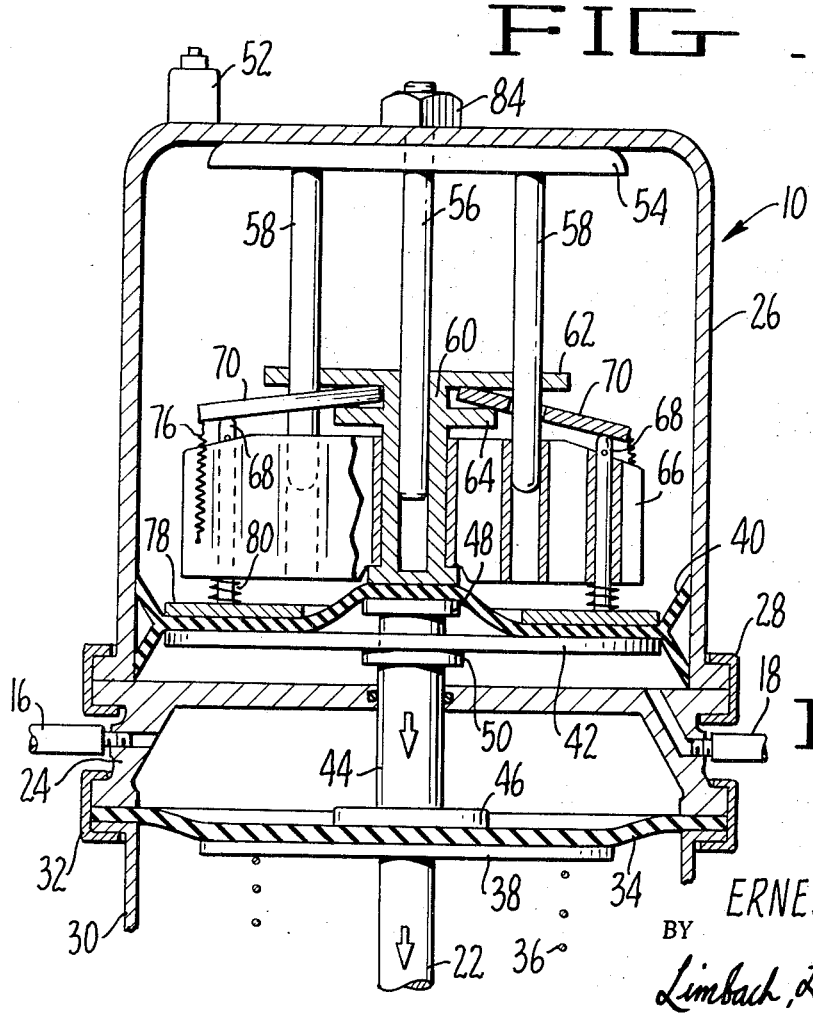

A metal plate 54 is mounted on the inside of the top of dome member 26 with the plate carrying a central rod 56 and three spaced apart rods 58 (see FIG. 3). A stem member 60 is slidably mounted on the central rod 56 with the stem member 60 containing an upper flange 62 apertured to slid on rod 58 and a lower flange 64 spaced downwardly from the flange 62. The lower end of the stem 60 extends to a position just above flexible diaphragm 40 where the lower end of the stem may apply a downwardly directed brake locking force on the top of brake operating member 44 as illustrated in FIG. 4. The lower of the stem 60 may be vulcanized or otherwise attached to the center of flexible diaphragm 40 where desired.

A spider 66 best seen in FIGS. 2 and 3 is mounted on the center stem 60 and is provided with longitudinal apertures slidably receiiving the rods 58 and a set of parallel apertures receiving a set of push pins 68 with one push pin for each of the rods 58. A metal link 70 is provided for each of the rods 58, and each link includes a central aperture receiving the rod 58, an inner end 72 positioned between the flanges 62 and 64 on stem 60 and an outer end 74 held in engagement with the top of push pin 68 by means of a tension spring 76 stretched between the link 70 and spider 66. The lower ends of all of the push pins 68 are connected together by a ring 78 which is vulcanized to the top of flexible diaphragm 40. A small compression spring 80 is provided around each of the push pins 68 holding the ring 78 and spider 66 apart, and a cotter pin 82 extends through each of the push pins 68 limiting the downward movement of the push pin through the spider 66 so that when the diaphragm 40 is forced downwardly it will pull the ring 78 with it, while the pins 82 pull the spider 66 downwardly.

When the port 18 is connected to vent by valve 20, air pressure in the captive air chamber above diaphragm 40 (or inside diaphragm 40 where a closed envelope is used as shown in my earlier patent) forces piston 42 downwardly until piston 42 engages the flange 50 on brake operating 44 forcing it downwardly to the brake engaged position as illustrated in FIG. 4. As the diaphragm 40 moves downwardly, the diaphragm pulls down on the ring 78 pulling spider 66 and stem 60 downwwardly so that the flange 62 on the top of stem 60 pushes downwardly on the inner ends 72 of links 70 causing the links to slide downwardly on rods 58. During this time, the upper plate 54, rods 56, rods 58, etc. are held on the upper side of the dome 26 by means of nut 84.

With the brake operating member 44 pushed downwardly as illustrated in FIG. 4, the lower end of stem 60 engages the diaphragm 40 above flange 48 on the brake operating member 44 so that the brake operating member 44 cannot move to the brake unlocked position without pushing stem 60 out of the way. Stem 60 is locked in its position of FIG. 4 because the flange 64 on stem 60 presses upwardly on the inner end 72 of links 70 causing the apertures in links 70 to grip the rods 58.

When it is desired to release the brakes, air under pressure is reintroduced into the port 18 forcing the piston 42 and diaphgram 40 upwardly. It should be noted that limited upward motion of the diaphragm and piston are possible before upward motion of the brake operating member 44 results because of the lost motion linkage between flanges 48 and 50 on the brake operating member 44. As the diaphragm 40 moves upwardly, it pushes upwardly on ring 78 to push upwardly on the push pins 68 which in turn press on the outer ends 74 of the links 70, moving the links to a position perpendicular to the rods 58 and unlocking the links from the rods 58 as illustrated in FIGS. 5 and 7 so that the apparatus may return to the position illustrated in FIG. 2.

As indicated above, the flexible membrane 40 may take the form of a bag which stretches and contacts during operation of the device instead of sliding on the wall of the device.. One example of this modified form of flexible membrane 40 is shown at 40' in FIG. 5 where the dome member 26 is divided into two elements 26A and 26B with the mouth of the diaphragm 40' secured between them by means of a ring 85.

While one specific embodiment of the invention has been illustrated and described in detail herein, it is obvious that many modifications thereof can be made without departing from the spirit and scope of the invention.

I claim:
1. A vehicle brake comprising:
a housing,
a brake operating member mounted in said housing for reciprocable movement between brake operating and brake releasing positions,
a piston within said housing and positioned with respect to said brake operating member for movement therewith, said piston being held by said brake operating member in a manner to be movable with respect thereto a short fixed distance,
a captive air chamber containing a body of fluid under pressure in said housing at one side of said piston with the fluid pressure of said captive chamber applied to said piston in a manner to move said brake operating member to said brake operating position,
a pressure chamber on the opposite side of said piston from said captive air chamber with said pressure chamber having a port for the introduction of pressurized fluid to move said piston in opposition to said captive body fluid pressure, and
a mechanical lock including means for locking said brake operating member against movement relative to said housing toward said brake releasing position when fluid pressure is released from said pressure chamber and additionally including means for unlocking said mechanical lock in response to introduction of pressurized fluid into said pressure chamber, said locking means including a one-way lock for permitting said brake operatingmember to move toward said brake operating position while locking said brake operating member agains movement in the opposite direction, said unlocking means including an unlocking device connected between said piston and said one-way lock for movement with respect to said brake operating member responsive to the introduction of fluid under pressure into said pressure chamber for locking said one-way lock, thereby permitting movement of said brake operating member to said brake releasing position, said mechanical lock additionally including an expansible support that comprises a first member adapted to engage said housing, a second member adapted to engage said piston and move therewith and a link extending between said first and second members with said link having an aperture surrounding one of said members and an end engaging the other of said members for pivoting said link to grip said one member in said aperture when said members are mvoed in one direction with respect to each other.

2. A vehicle brake comprising:

a housing, a brake operating member mounted in said housing for reciprocable movement between brake operating and brake releasing positions, a piston within said housing and positioned with respect to said brake operating member for movement therewith, a captive air chamber containing a body of fluid under pressure in said housing at one side of said piston with the fluid pressure of said captive chamber applied to said piston in a manner to move said brake operating member to said brake operating position, a pressure chamber on the opposite side of said piston from said captive air chamber with said pressure chamber having a port for the introduction of pressurized fluid to move said piston in opposition to said captive body fluid pressure, and a mechanical lock including means for locking said brake operating member against movement relative to said housing toward said brake releasing position when fluid pressure is released from said pressure chamber and additionally including means for unlocking said mechanical lock in response to introduction of pressurized fluid into said pressure chamber, said mechanical lock comprising:

a plurality of rods mounted in said housing in said captive air chamber and extending toward said piston, a lock stem in said captive air chamber between said rods and operatively engaging said brake operating member for movement therewith along a path parallel to said rods as said brake operating member moves between said brake operating and brake releasing positions, a plurality of links with a separate link extending from said stem to each of said rods and having an aperture surrounding said rod for gripping said rod when said stem is pushed by said brake operating member moving toward said brake releasing position, spring means engaging each of said links on the opposite side of its aperture from said stem and urging said links toward said brake operating member, a spider mounted on said stem, nd a set of push pins slidably mounted in said spider for movement with respect to said stem along a path parallel to said rods with one nd of each of said pins engaging one of said links on the side of the aperture therein opposite said stem for unlocking said link from said rod nd another end of each of said pins being operably connected to said piston for movement therewith.

3. A mechanism for controllably locking and unlocking a vehicle brake, comprising:

a brake operating member movable between brake engaging and brake releasing extreme positions and having first and second stops attached thereto spaced a distance apart, a flange captured on said brake operating member between its said stops and movable therebetween, a captive fluid body positioned to normally urge said flange against the first stop of the operating member with force capable of moving said member to its brake engaing position, a fluid pressure chamber communicating with said flange in a manner that the flange is urged against the second stop of the operating member fo moving said member to its brake release position when the fluid pressure within said chamber is sufficient to overcome an oppositely directed force of said captive fluid body, and means responsive to the position of said flange relativ to the brake operating member for locking the brake operating member against movement toward its brake releasing position when said flange is against said first stop and for unlocking the brake operating member when said flange is against said second stop, whereby fluid pressure within said pressure chamber controls the state of said lock.

4. The mechanism of claim 3 wherein said brake operating member is a rod and said first and second stops are spaced apart flanges rigidly attached to said rod adjacent one end thereof.

5. The mechanism of claim 3 wherein said locking means includes a one-way lock that permits the brake operating member to move toward its said brake operating position when either locked or unlocked.

* * * * *